(12) United States Patent
Syouda

(10) Patent No.: US 10,461,642 B2
(45) Date of Patent: Oct. 29, 2019

(54) BOOSTING A REGENERATIVE VOLTAGE AND SELECTING A BOOST CONVERTER BASED ON EFFICIENCY

(71) Applicant: Yazaki Corporation, Tokyo (JP)

(72) Inventor: Takahiro Syouda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/673,036

(22) Filed: Aug. 9, 2017

(65) Prior Publication Data
US 2018/0062519 A1 Mar. 1, 2018

(30) Foreign Application Priority Data
Aug. 25, 2016 (JP) ................ 2016-164948

(51) Int. Cl.
*H02J 7/14* (2006.01)
*H02M 3/158* (2006.01)

(52) U.S. Cl.
CPC ................ *H02M 3/1584* (2013.01)

(58) Field of Classification Search
CPC ......... H02M 3/1584; H02M 2003/077; H02M 3/18; H02M 3/3372; H02M 3/3378; H02M 3/3384; H02J 7/0024; H02J 7/1423; H02J 1/102; H01M 10/441; H01M 10/482; H01M 2220/20
See application file for complete search history.

(56) References Cited

U.S. PATENT DOCUMENTS

| 6,154,381 A * | 11/2000 | Kajouke | B60L 1/00 363/65 |
|---|---|---|---|
| 2009/0115375 A1 | 5/2009 | Iida | |
| 2010/0219687 A1* | 9/2010 | Oh | G05F 1/46 307/39 |
| 2012/0163051 A1* | 6/2012 | Vogman | H02M 1/4208 363/125 |
| 2012/0245785 A1* | 9/2012 | Tamagawa | B60K 6/442 701/22 |
| 2012/0261997 A1 | 10/2012 | Kang | |

(Continued)

FOREIGN PATENT DOCUMENTS

| CN | 101428568 A | 5/2009 |
|---|---|---|
| JP | 2011-30355 A | 2/2011 |

*Primary Examiner* — Jeffrey A Gblende
*Assistant Examiner* — Peter M Novak
(74) *Attorney, Agent, or Firm* — Kenealy Vaidya LLP

(57) ABSTRACT

A voltage conversion device includes first and second converters. The first converter boosts an input voltage equal to or higher than a reference voltage (high regenerative voltage) to a first voltage more efficiently than the second converter boosting the input voltage equal to or higher than the reference voltage (high regenerative voltage) to the first voltage. The second converter boosts an input voltage lower than the reference voltage (low regenerative voltage) to a second voltage more efficiently than the first converter boosting the input voltage lower than the reference voltage (low regenerative voltage) to the second voltage. The voltage conversion device causes the first converter to boost the input voltage when the input voltage is equal to or higher than the reference voltage, and causes the second converter to boost the input voltage when the input voltage is lower than the reference voltage.

4 Claims, 2 Drawing Sheets

(56) References Cited

U.S. PATENT DOCUMENTS

| | | | |
|---|---|---|---|
| 2013/0049657 A1* | 2/2013 | Rozman | B60W 10/08 |
| | | | 318/400.3 |
| 2013/0335096 A1* | 12/2013 | Hasenkopf | B60L 11/1855 |
| | | | 324/434 |
| 2014/0015507 A1* | 1/2014 | Park | G05F 1/46 |
| | | | 323/304 |
| 2015/0137597 A1 | 5/2015 | Adelson | |
| 2016/0020443 A1* | 1/2016 | White | H02J 7/0024 |
| | | | 318/245 |
| 2017/0373584 A1* | 12/2017 | Hiyama | H02M 3/3378 |

* cited by examiner

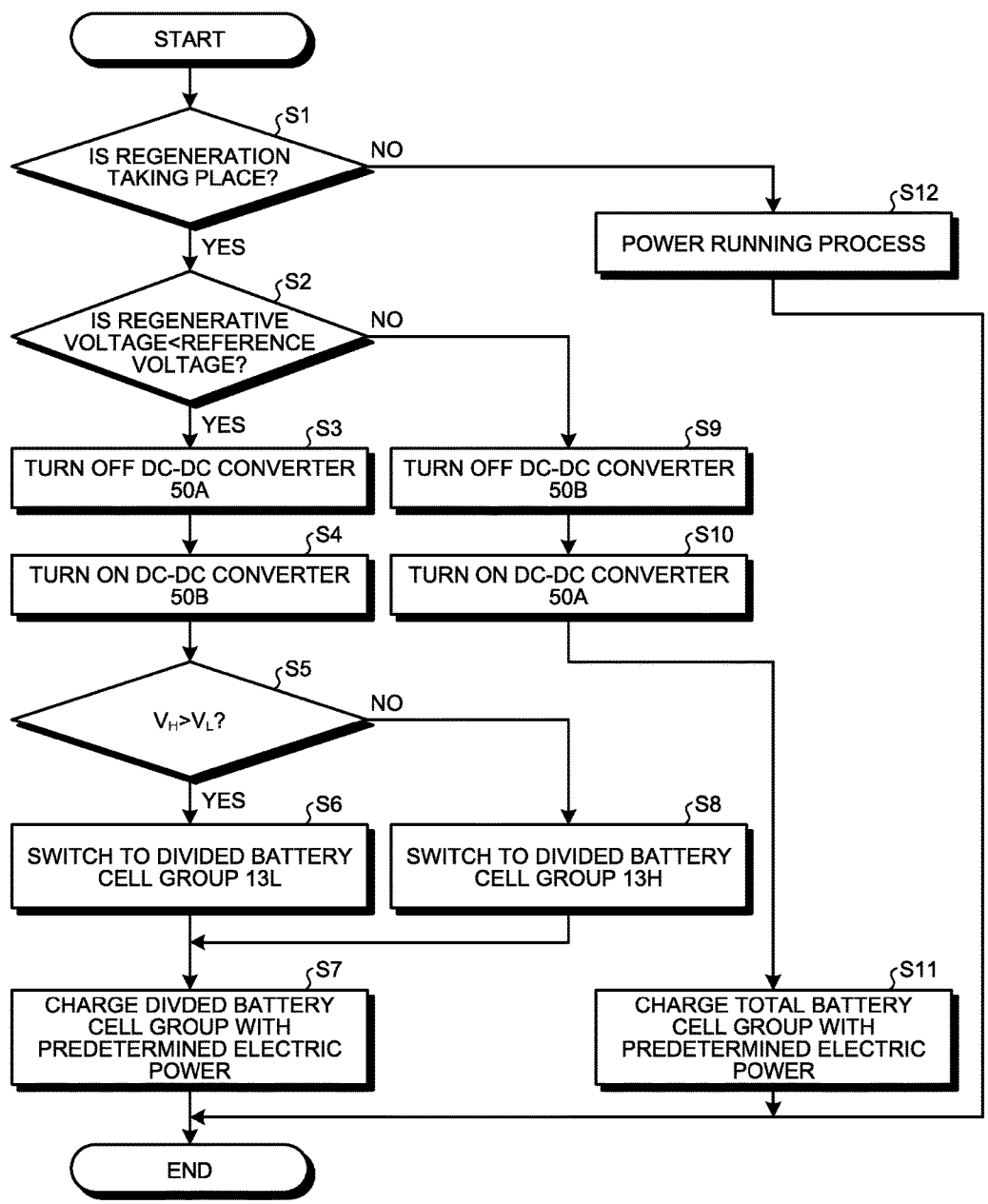

BOOSTING A REGENERATIVE VOLTAGE AND SELECTING A BOOST CONVERTER BASED ON EFFICIENCY

CROSS-REFERENCE TO RELATED APPLICATION(S)

The present application claims priority to and incorporates by reference the entire contents of Japanese Patent Application No. 2016-164948 filed in Japan on Aug. 25, 2016.

BACKGROUND OF THE INVENTION

1. Field of the Invention

The present invention relates to a voltage conversion device.

2. Description of the Related Art

Conventionally, there is known a voltage conversion device converting a direct current input voltage to a predetermined voltage. For example, the voltage conversion device is mounted on a vehicle such as an electric vehicle (EV), and charges a storage battery by boosting a regenerative voltage that is generated according to a regeneration control of the vehicle, to a predetermined voltage (for reference, Japanese Patent Application Laid-open No. 2011-30355).

The voltage conversion device is often configured to boost a relatively high regenerative voltage. Thus, it has been difficult to boost a relatively low regenerative voltage.

SUMMARY OF THE INVENTION

The present invention has been made in view of the above, and an object of the present invention is to provide a voltage conversion device that can properly boost a regenerative voltage even if the regenerative voltage is relatively low.

In order to achieve the above mentioned object, a voltage conversion device according to one aspect of the present invention includes a first converter that boosts a direct current input voltage that is equal to or higher than a predetermined reference voltage to a direct current first voltage, a second converter that boosts a direct current input voltage that is lower than the reference voltage to a direct current second voltage that is lower than the direct current first voltage, and a controller that switches between the first converter and the second converter, wherein the first converter boosts the input voltage that is equal to or higher than the reference voltage to the first voltage more efficiently than the second converter boosting the input voltage that is equal to or higher than the reference voltage to the first voltage, the second converter boosts the input voltage that is lower than the reference voltage to the second voltage more efficiently than the first converter boosting the input voltage that is lower than the reference voltage to the second voltage, and the controller causes the first converter to boost the input voltage when the input voltage is equal to or higher than the reference voltage, and the controller causes the second converter to boost the input voltage when the input voltage is lower than the reference voltage.

According to another aspect of the present invention, the voltage conversion device further may include a power storage unit that includes a plurality of battery cells, the power storage unit storing therein electric power output from the first converter or the second converter, wherein, when a first connection mode is a state of forming a total battery cell group in which all the battery cells are connected in series, and a second connection mode is a state of forming a plurality of divided battery cell groups in which a part of the battery cells are connected in series, and each of the divided battery cell groups may include battery cells differing from one another, the controller may charge the power storage unit with the first connection mode provided that the first converter boosts the input voltage to the first voltage, and charge the power storage unit with the second connection mode provided that the second converter boosts the input voltage to the second voltage.

According to still another aspect of the present invention, the voltage conversion device further may include a voltage detector that detects voltage of the divided battery cell groups, wherein the controller may detect the voltage of each of the divided battery cell groups using the voltage detector in the second connection mode, and may charge the divided battery cell group having a relatively low voltage.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a flowchart illustrating an operational example of the voltage conversion device according to the embodiment.

DETAILED DESCRIPTION OF THE PREFERRED EMBODIMENTS

Figure 1:
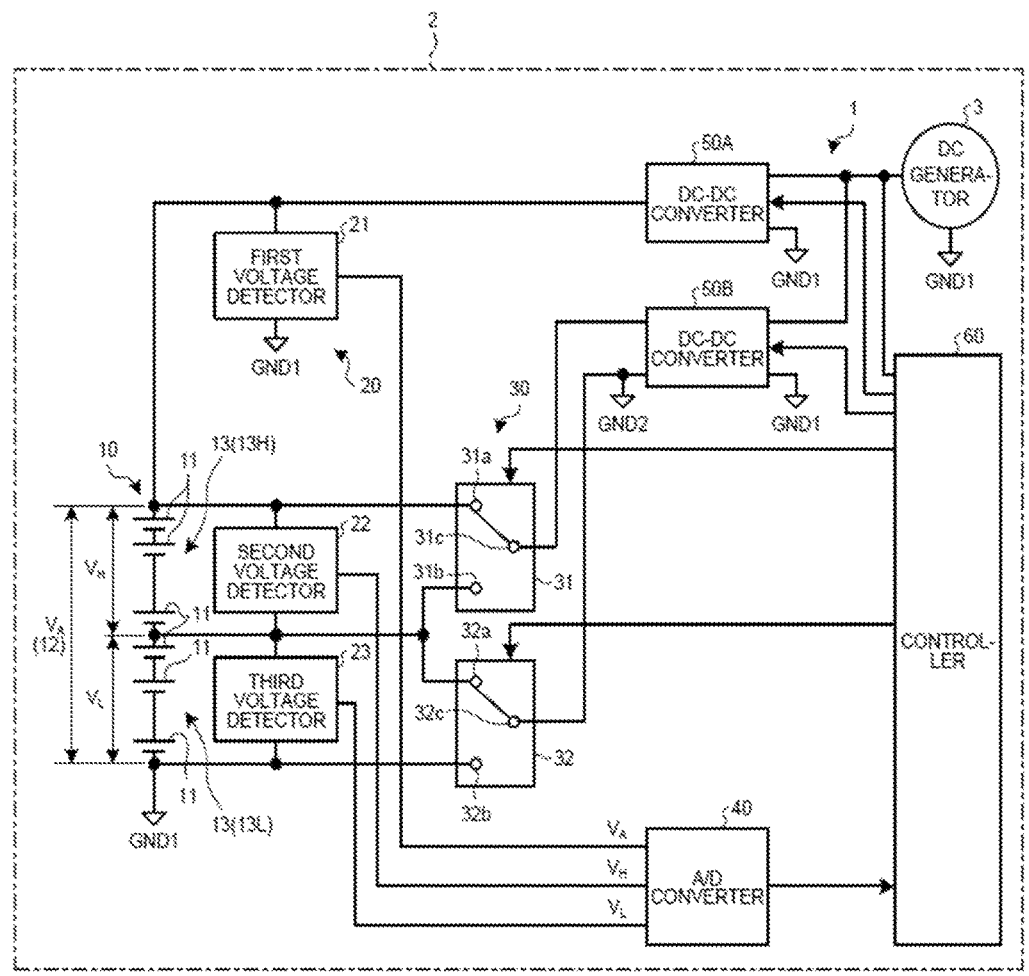
FIG. 1 is a block diagram illustrating a configuration example of a voltage conversion device according to an embodiment.

An embodiment according to the present invention will be described hereinafter in detail with reference to the accompanying drawings. The present invention should not be construed as being limited to the description in the following embodiment. Moreover, components described below include components that can be easily assumed by a person skilled in the art, and components that are substantially the same as those components. Furthermore, the components described below can be combined with one another as appropriate. Still furthermore, various omissions, substitutions, or changes may be made without departing from the spirit of the present invention.

Embodiment

A voltage conversion device 1 according to an embodiment will be described. The voltage conversion device 1 is referred to as a device that converts a direct current input voltage to a predetermined voltage. In the present embodiment, the voltage conversion device 1 is mounted on, for example, a vehicle 2 such as an electric vehicle (EV), a plug-in hybrid electric vehicle (PHEV), a hybrid electric vehicle (HEV), and the like.

The vehicle 2 has a function of converting the kinetic energy of wheels into electric energy during deceleration, and collecting the energy (regenerative brake). For example, in the vehicle 2, an electromotive voltage (regenerative voltage) is generated when a driver steps on a brake pedal, which is not illustrated, the rotational force of the wheels is transmitted to a generator 3 of the vehicle 2, and the generator 3 is rotated. The voltage conversion device 1 charges a storage battery (secondary battery) 10 of the vehicle 2, by boosting the regenerative voltage generated by the generator 3. The regenerative voltage is higher as the vehicle 2 is traveling relatively fast and the kinetic energy is high. The regenerative voltage is lower as the vehicle 2 is traveling relatively slow and the kinetic energy is low. Note that the generator 3 may be a driving motor for driving the wheel that also has the function of the generator 3, or the generator 3 may be provided in addition to the driving motor. Hereinafter, the voltage conversion device 1 will be described in detail.

In FIG. 1, the voltage conversion device 1 includes the storage battery 10 as a power storage unit, a voltage detector 20, a switch unit 30, an analog-to-digital (A/D) converter 40, a direct current-direct current (DC-DC) converter 50A as a first converter, a DC-DC converter 50B as a second converter, and a controller 60.

For example, the storage battery 10 is a driving battery that is mounted on the vehicle 2, and that rotates and drives the wheels of the vehicle 2. For example, the storage battery 10 is a lithium ion battery, and stores driving electric power. For example, the storage battery 10 stores therein electric power output from the DC-DC converter 50A or the DC-DC converter 50B. The storage battery 10 includes a plurality of battery cells 11. In the storage battery 10, the battery cells 11 are electrically connected in series. The storage battery 10 may be charged by connecting all the battery cells 11 in series, or may be charged by connecting a part of the battery cells 11 in series. In this example, a first connection mode is a state of forming a total battery cell group 12 in which all of the battery cells 11 are connected in series. Moreover, a second connection mode is a state of forming a plurality of divided battery cell groups 13 in which a part of the battery cells 11 are connected in series. In the second connection mode, each of the divided battery cell groups 13 includes battery cells 11 differing from one another. In the second connection mode of the present embodiment, the storage battery 10 is divided into two of a divided battery cell group 13H at a high potential side and a divided battery cell group 13L at a low potential side. The storage battery 10 may be divided into more number of divided battery cell groups 13 than the two divided battery cell groups 13H and 13L. In the present embodiment, the battery cells 11 include batteries having the same capacity and the same electromotive voltage. The divided battery cell group 13H and the divided battery cell group 13L both have the same number of the battery cells 11. Voltage $V_H$ at which each of the battery cells 11 of the divided battery cell group 13H is fully charged and voltage $V_L$ at which each of the battery cells 11 of the divided battery cell group 13L is fully charged, are equivalent. The storage battery 10 is discharged in a state where all the battery cells 11 are connected in series.

The voltage detector 20 detects the voltage of the storage battery 10. The voltage detector 20 includes a first voltage detector 21, a second voltage detector 22, and a third voltage detector 23. The first voltage detector 21 is connected to the positive and negative terminals of the total battery cell group 12, detects voltage $V_A$ of the total battery cell group 12, and outputs a voltage detection signal to the controller 60 via the A/D converter 40. The second voltage detector 22 is connected to the positive and negative terminals of the divided battery cell group 13H, detects voltage $V_H$ of the divided battery cell group 13H, and outputs a voltage detection signal to the controller 60 via the A/D converter 40. The third voltage detector 23 is connected to the positive and negative terminals of the divided battery cell group 13L, detects voltage $V_L$ of the divided battery cell group 13L, and outputs a voltage detection signal to the controller 60 via the A/D converter 40.

The switch unit 30 switches a path through which electric current flows. The switch unit 30 is connected to the DC-DC converter 50B and the storage battery 10, and switches the electric current that flows from the DC-DC converter 50B to the storage battery 10, based on a switch signal from the controller 60, which will be described below. For example, the switch unit 30 switches the electric current that is output from the DC-DC converter 50B to allow it to flow to the divided battery cell group 13H or the divided battery cell group 13L of the storage battery 10. The switch unit 30 includes a first switch 31 and a second switch 32. The first switch 31 includes a terminal 31a that is connected to the positive terminal of the divided battery cell group 13H, a terminal 31b that is connected to the positive terminal of the divided battery cell group 13L, and a terminal 31c that is connected to the negative terminal of the DC-DC converter 50B. The second switch 32 includes a terminal 32a that is connected to the negative terminal of the divided battery cell group 13H, a terminal 32b that is connected to the negative terminal of the divided battery cell group 13L, and a terminal 32c that is connected to the positive terminal of the DC-DC converter 50B.

The switch unit 30 connects the positive side terminal 32c of the DC-DC converter 50B with the negative side terminal 32a of the divided battery cell group 13H, and also connects the positive side terminal 31a of the divided battery cell group 13H with the negative side terminal 31c of the DC-DC converter 50B, based on a switch signal. Consequently, the switch unit 30 forms a pathway through which the electric current output from the DC-DC converter 50B flows to the divided battery cell group 13H. Moreover, the switch unit 30 connects the positive side terminal 32c of the DC-DC converter 50B with the negative side terminal 32b of the divided battery cell group 13L, and also connects the positive side terminal 31b of the divided battery cell group 13L with the negative side terminal 31c of the DC-DC converter 50B, based on a switch signal. Consequently, the switch unit 30 forms a pathway through which the electric current output from the DC-DC converter 50B flows to the divided battery cell group 13L.

The A/D converter 40 converts an analog signal to a digital signal. The A/D converter 40 is connected to the first voltage detector 21, the second voltage detector 22, the third voltage detector 23, and the controller 60. The A/D converter 40 converts an analog voltage detection signal output from each of the voltage detectors 21 to 23 to a digital voltage detection signal, and outputs the digital voltage detection signal to the controller 60.

The DC-DC converter 50A is a converter that boosts a direct current input voltage (referred to as a regenerative voltage). The DC-DC converter 50A is connected to the generator 3 and the storage battery 10, and boosts a relatively high direct current regenerative voltage that is output from the generator 3, to a constant voltage. For example, the DC-DC converter 50A boosts a regenerative voltage that is equal to or higher than a predetermined reference voltage which is previously set (referred to as a high regenerative voltage) to a direct current first voltage. In this example, the reference voltage is suitably set to an efficient value according to the specifications of the DC-DC converters 50A and 50B. For example, the reference voltage is voltage at which the conversion efficiency between the DC-DC converter 50A and the DC-DC converter 50B is reversed. The first voltage is voltage of about a few hundred volts, and is about 300V to 400V, for example. However, it is not limited thereto. The first voltage may be suitably set according to the type of vehicle and the like. The DC-DC converter 50A boosts a predetermined high regenerative voltage to the first voltage more efficiently than the DC-DC converter 50B boosting the predetermined high regenerative voltage to the first voltage. That is, when the DC-DC converter 50A boosts a certain high regenerative voltage to the first voltage, the ratio of the output power relative to the regenerative power is higher than that of the DC-DC converter 50B. This is because a coil (not illustrated), an electronic element such as a switching element (not illustrated), and the like used to boost the high regenerative voltage to the first voltage in the DC-DC converter 50A are suitable than those of the DC-DC converter 50B. Electric current flows through the coil to generate electromotive force. The switching element turns on and turns off the electric current flowing through the coil. The DC-DC converter 50A outputs the electric power boosted to the first voltage to the storage battery 10 (total battery cell group 12). It is to be noted that the DC-DC converter 50A may be a non-insulating converter or an insulating converter.

The DC-DC converter 50B is a converter that boosts the direct current regenerative voltage. The DC-DC converter 50B is connected to the generator 3 and the storage battery 10, and boosts a relatively low direct current regenerative voltage that is output from the generator 3, to a constant voltage. For example, the DC-DC converter 50B boosts a regenerative voltage that is lower than the reference voltage (referred to as a low regenerative voltage) to a direct current second voltage that is lower than the first voltage. For example, the second voltage is about 150V to 200V. However, it is not limited thereto. The second voltage is suitably set according to the first voltage and the like. The DC-DC converter 50B boosts a predetermined low regenerative voltage to the second voltage more efficiently than the DC-DC converter 50A boosting the predetermined low regenerative voltage to the second voltage. That is, when the DC-DC converter 50B boosts a certain low regenerative voltage to the second voltage, the ratio of the output power relative to the regenerative power is higher than that of the DC-DC converter 50A. This is because a coil (not illustrated), an electronic element such as a switching element (not illustrated), and the like used to boost the low regenerative voltage to the second voltage in the DC-DC converter 50B are suitable than those of the DC-DC converter 50A. Electric current flows through the coil to generate electromotive force. The switching element turns on and turns off the electric current flowing through the coil. The DC-DC converter 50B outputs the electric power boosted to the second voltage to the storage battery 10 (divided battery cell group 13). In this manner, the present embodiment can properly boost the regenerative voltage even if the regenerative voltage is relatively high or even if the regenerative voltage is relatively low, by including the DC-DC converter 50A that properly boosts the high regenerative voltage as well as the DC-DC converter 50B that properly boosts the low regenerative voltage. The DC-DC converter 50B is an insulating converter. This is to prevent the positive terminal side of the divided battery cell group 13L from connecting to GND1, and short-circuiting to GND1 of the negative terminal side of the divided battery cell group 13L.

The controller 60 controls the boosting of voltage and the storing of power in the storage battery 10. The controller 60 includes an electronic circuit mainly formed of known microcomputers including a central processing unit (CPU), a read-only memory (ROM) or a random-access memory (RAM) included in a storage unit, and an interface. The controller 60 is connected to the generator 3 and the DC-DC converters 50A and 50B, and switches between the DC-DC converter 50A and the DC-DC converter 50B, based on voltage (regenerative voltage) output from the generator 3. For example, the controller 60 compares the voltage (regenerative voltage) output from the generator 3 with the reference voltage. When the regenerative voltage is equal to or higher than the reference voltage, the controller 60 performs switching so that the DC-DC converter 50A boosts the regenerative voltage. For example, when the regenerative voltage is equal to or higher than the reference voltage, the controller 60 turns on the DC-DC converter 50A, and turns off the DC-DC converter 50B. Moreover, when the regenerative voltage is lower than the reference voltage, the controller 60 performs switching so that the DC-DC converter 50B boosts the regenerative voltage. For example, when the regenerative voltage is lower than the reference voltage, the controller 60 turns off the DC-DC converter 50A and turns on the DC-DC converter 50B.

Moreover, the controller 60 is connected to the A/D converter 40 and the switch unit 30, and controls the switch unit 30 based on a voltage detection signal that is output through the A/D converter 40. For example, when the voltage $V_H$ of the divided battery cell group 13H is lower than the voltage $V_L$ of the divided battery cell group 13L, the controller 60 outputs a switch signal to the switch unit 30 so that the switch unit 30 is switched to charge the divided battery cell group 13H. Moreover, when the voltage $V_L$ of the divided battery cell group 13L is lower than the voltage $V_H$ of the divided battery cell group 13H, the controller 60 outputs a switch signal to the switch unit 30 so that the switch unit 30 is switched to charge the divided battery cell group 13L. When the voltage $V_H$ and the voltage $V_L$ of the respective divided battery cell groups 13H and 13L are charge termination voltages, the controller 60 stops charging the divided battery cell groups 13H and 13L. Moreover, when the voltage $V_A$ of the total battery cell group 12 is the charge termination voltage, the controller 60 stops charging the total battery cell group 12. In FIG. 1, the first voltage detector 21 is connected to GND1, the generator 3 is connected to GND1, the DC-DC converter 50A is connected to GND1, and the DC-DC converter 50B is connected to GND1 and GND2.

Next, an operational example of the voltage conversion device 1 will be described with reference to FIG. 2. The controller 60 determines whether a regeneration process is taking place (step S1). For example, the controller 60 determines that the regeneration process is taking place, when a regenerative voltage is generated after a driver steps on a brake pedal, the rotational force of the wheel is transmitted to the generator 3 of the vehicle 2, and the generator 3 is rotated. Upon determining that the regeneration process is taking place (Yes at step S1), the controller 60 determines whether the regenerative voltage is low (step S2). For example, the controller 60 compares the reference voltage with the regenerative voltage. When the regenerative voltage is lower than the reference voltage (low regenerative voltage) (Yes at step S2), the controller 60 turns off the DC-DC converter 50A (step S3) and turns on the DC-DC converter 50B (step S4). Next, when the DC-DC converter 50B boosts the low regenerative voltage to the second voltage, the controller 60 charges the power storage unit 10 in the second connection mode. For example, the controller 60 compares the voltage $V_H$ of the divided battery cell group 13H with the voltage $V_L$ of the divided battery cell group 13L, and when the voltage $V_L$ of the divided battery cell group 13L is lower than the voltage $V_H$ of the divided battery cell group 13H (Yes at step S5), the controller 60 switches the switch unit 30 so that the divided battery cell group 13L is charged (step S6). For example, the controller 60 connects the terminal 32c with the terminal 32b of the second switch 32, and also connects the terminal 31b with the terminal 31c of the first switch 31. Next, the controller 60 charges the divided battery cell group 13 with a predetermined electric power (step S7). For example, the controller 60 charges the divided battery cell group 13L with a predetermined amount of electric power that is boosted to the second voltage from the low regenerative voltage by the DC-DC converter 50B, and finishes the process. By charging the divided battery cell group 13L having voltage that is lower than that of the divided battery cell group 13H, the controller 60 keeps the balance of the charge amounts between the divided battery cell group 13H and the divided battery cell group 13L. Consequently, the controller 60 can uniformly charge the battery cells 11 of the storage battery 10, and the functions of the storage battery 10 can be fully exerted.

At step S5 described above, when the voltage $V_H$ of the divided battery cell group 13H is lower than the voltage $V_L$ of the divided battery cell group 13L (No at step S5), the controller 60 switches the switch unit 30 so that the divided battery cell group 13H is charged (step S8). For example, the controller 60 connects the terminal 32c with the terminal 32a of the second switch 32, and also connects the terminal 31a with the terminal 31c of the first switch 31.

Moreover, at step S2 described above, when the regenerative voltage is equal to or higher than the reference voltage (high regenerative voltage) (No at step S2), the controller 60 turns off the DC-DC converter 50B (step S9) and turns on the DC-DC converter 50A (step S10). Next, when the DC-DC converter 50A boosts the high regenerative voltage to the first voltage, the controller 60 charges the power storage unit 10 with a predetermined electric power in the first connection mode (step S11). For example, the controller 60 charges the total battery cell group 12 with the electric power that is boosted to the first voltage from the high regenerative voltage by the DC-DC converter 50A, and finishes the process.

Moreover, at step S1 described above, when the controller 60 determines that the regeneration process is not taking place (No at step S1), the controller 60 performs a power running process of driving the vehicle 2 (step S12), and finishes the process.

As described above, in the voltage conversion device 1 according to the embodiment, the DC-DC converter 50A boosts the input voltage that is equal to or higher than the reference voltage (high regenerative voltage) to the first voltage more efficiently than the DC-DC converter 50B boosting the input voltage that is equal to or higher than the reference voltage (high regenerative voltage) to the first voltage. Moreover, the DC-DC converter 50B boosts the input voltage that is lower than the reference voltage (low regenerative voltage) to the second voltage more efficiently than the DC-DC converter 50A boosting the input voltage that is lower than the reference voltage (low regenerative voltage) to the second voltage. When the input voltage is equal to or higher than the reference voltage, the voltage conversion device 1 causes the DC-DC converter 50A to boost the input voltage. When the input voltage is lower than the reference voltage, the voltage conversion device 1 causes the DC-DC converter 50B to boost the input voltage. In this manner, by using the DC-DC converter 50A that can efficiently boost the high regenerative voltage and the DC-DC converter 50B that can efficiently boost the low regenerative voltage, the voltage conversion device 1 can properly boost the regenerative voltage, even if the regenerative voltage is relatively high or even if the regenerative voltage is relatively low.

In the conventional voltage conversion device, a single DC-DC converter is often used to boost a relatively high regenerative voltage. Thus, it is difficult to boost a relatively low regenerative voltage. Moreover, in the conventional voltage conversion device, a single DC-DC converter is used to boost a wide range of regenerative voltages from the relatively high regenerative voltage to the relatively low regenerative voltage, to a certain voltage. Thus, there has been the problem that the boosting ratio is increased, and the conversion efficiency is lowered when the regenerative voltage is relatively high. One of the reasons for this is because when the boosting ratio is increased, the coil size of the DC-DC converter will be increased, and the resistance of the coil (copper loss) will also be increased, for example.

On the other hand, in the voltage conversion device 1 according to the embodiment, when the regenerative voltage is relatively high, the regenerative voltage is boosted to the first voltage using the DC-DC converter 50A. Thus, for example, the coil size can be reduced, and it is possible to efficiently boost the high regenerative voltage. Moreover, in the voltage conversion device 1, when the regenerative voltage is relatively low, the regenerative voltage is boosted to the second voltage using the DC-DC converter 50B. Thus, the boosting ratio can be reduced than that of the conventional example, and it is possible to efficiently boost the low regenerative voltage.

Moreover, in the voltage conversion device 1, when the DC-DC converter 50A is used to boost the input voltage to the first voltage, the storage battery 10 is charged in the first connection mode, and when the DC-DC converter 50B is used to boost the input voltage to the second voltage, the storage battery 10 is charged in the second connection mode. Consequently, in the voltage conversion device 1, when the input voltage is boosted to the first voltage, it is possible to charge the total battery cell group 12 having voltage corresponding to the first voltage. Moreover, in the voltage conversion device 1, when the input voltage is boosted to the second voltage, it is possible to charge the divided battery cell group 13 having voltage corresponding to the second voltage. Thus, the voltage conversion device 1 can charge the storage battery 10 even if the input voltage is boosted to the second voltage that is lower than the first voltage. Hence, it is possible to reduce the boosting ratio when the regenerative voltage is relatively low.

Moreover, in the voltage conversion device 1, the voltage detector 20 detects the voltage of each of the divided battery cell groups 13 in the second connection mode, and charges the divided battery cell group 13 having a relatively low voltage. In this manner, the voltage conversion device 1 can keep the balance of the charge amounts of the divided battery cell groups 13. Consequently, the voltage conversion device 1 can uniformly charge the battery cells 11 of the storage battery 10, and the functions of the storage battery 10 can be fully exerted.

Modification

The voltage conversion device 1 may be mounted on any places other than the vehicle 2. For example, the voltage conversion device 1 may be mounted on an electric train, an elevator, and the like, and may boost the regenerative voltage generated by the electric train, the elevator, and the like.

Although it has been described that the battery cells 11 include the batteries having the same capacity and the same electromotive voltage in the above-described example, they are not limited thereto, and the batteries may have different capacities and electromotive voltages.

Although it has been described that the storage battery 10 includes the battery cells 11 in the above-described example, the storage battery 10 may include other components than the battery cells 11.

In the voltage conversion device according to the present embodiment, the first converter boosts the input voltage that is equal to or higher than the reference voltage to the first voltage more efficiently than the second converter boosting the input voltage that is equal to or higher than the reference voltage to the first voltage, and the second converter boosts the input voltage that is lower than the reference voltage to the second voltage more efficiently than the first converter boosting the input voltage that is lower than the reference voltage to the second voltage. When the input voltage is equal to or higher than the reference voltage, the voltage conversion device causes the first converter to boost the input voltage, and when the input voltage is lower than the reference voltage, the voltage conversion device causes the second converter to boost the input voltage. Consequently, the voltage conversion device can properly boost the regenerative voltage even if the regenerative voltage is relatively low.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A voltage conversion device, comprising:
   a first converter that boosts a direct current input voltage that is equal to or higher than a predetermined reference voltage to a direct current first voltage;
   a second converter that boosts the direct current input voltage that is lower than the reference voltage to a direct current second voltage that is lower than the direct current first voltage;
   a controller that switches between the first converter and the second converter; and
   a power storage unit that includes a plurality of battery cells, the power storage unit storing therein an electric power output from the first converter or the second converter, wherein
   the first converter boosts the direct current input voltage that is equal to or higher than the reference voltage to the direct current first voltage more efficiently than the second converter boosting the direct current input voltage that is equal to or higher than the reference voltage to the direct current first voltage,
   the second converter boosts the direct current input voltage that is lower than the reference voltage to the direct current second voltage more efficiently than the first converter boosting the direct current input voltage that is lower than the reference voltage to the direct current second voltage,
   the controller turns on the first converter and turns off the second converter, causing the first converter to boost the direct current input voltage when the direct current input voltage is equal to or higher than the reference voltage, thereby increasing a ratio of an electric power output than when the second converter boosts the direct current input voltage,
   the controller turns off the first converter and turns on the second converter, causing the second converter to boost the direct current input voltage when the direct current input voltage is lower than the reference voltage, thereby increasing a ratio of an electric power output than when the first converter boosts the direct current input voltage, and
   when a first connection mode is a state of forming a total battery cell group in which all the battery cells are connected in series, and a second connection mode is a state of forming a plurality of divided battery cell groups in which a part of the battery cells are connected in series, and each of the divided battery cell groups includes battery cells differing from one another, the controller charges the power storage unit in the first connection mode when the first converter boosts the direct current input voltage to the direct current first voltage, and charges the power storage unit in the second connection mode when the second converter boosts the direct current input voltage to the direct current second voltage.

2. The voltage conversion device according to claim 1, further comprising:
   a voltage detector that detects voltage of the divided battery cell groups, wherein
   the controller detects the voltage of each of the divided battery cell groups using the voltage detector and charges the divided battery cell group having a relatively low voltage, in the second connection mode.

3. The voltage conversion device according to claim 1, wherein when the first converter boosts the direct current input voltage to the direct current first voltage, a ratio of an electric power output of the first converter relative to the direct current input voltage is higher than that of the second converter, and when the second converter boosts the direct current input voltage to the direct current second voltage, a ratio of an electric power output of the second converter relative to the direct current input voltage is higher than that of the first converter.

4. The voltage conversion device according to claim 1, wherein the direct current input voltage is a regenerative voltage.

* * * * *